Figure 1:
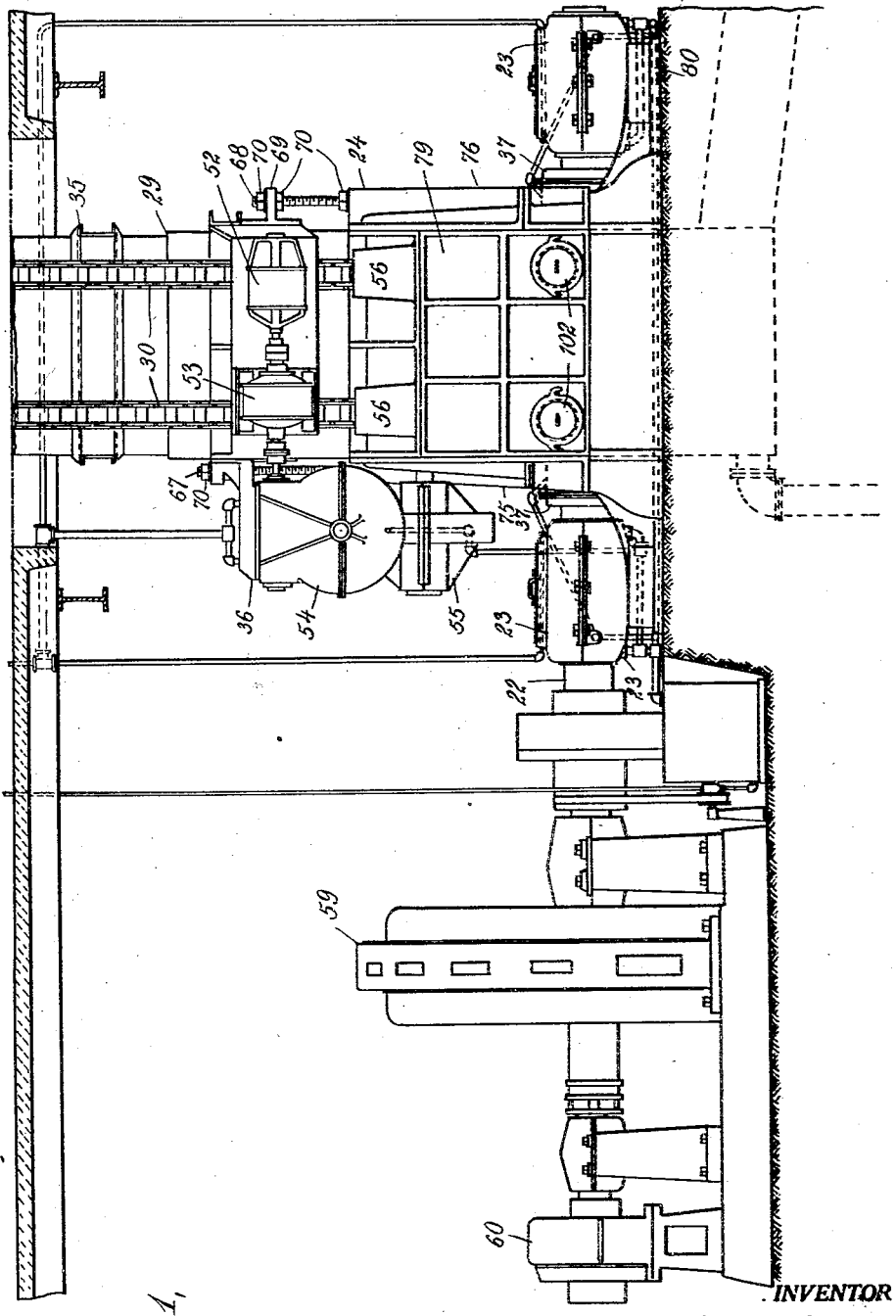

Aug. 19, 1924.  1,505,757
J. J. WARREN
APPARATUS FOR GRINDING WOOD PULP
Filed Oct. 14, 1922   7 Sheets-Sheet 1

INVENTOR
John J. Warren
BY Pennie, Davis, Marvin & Edmonds
his ATTORNEYS

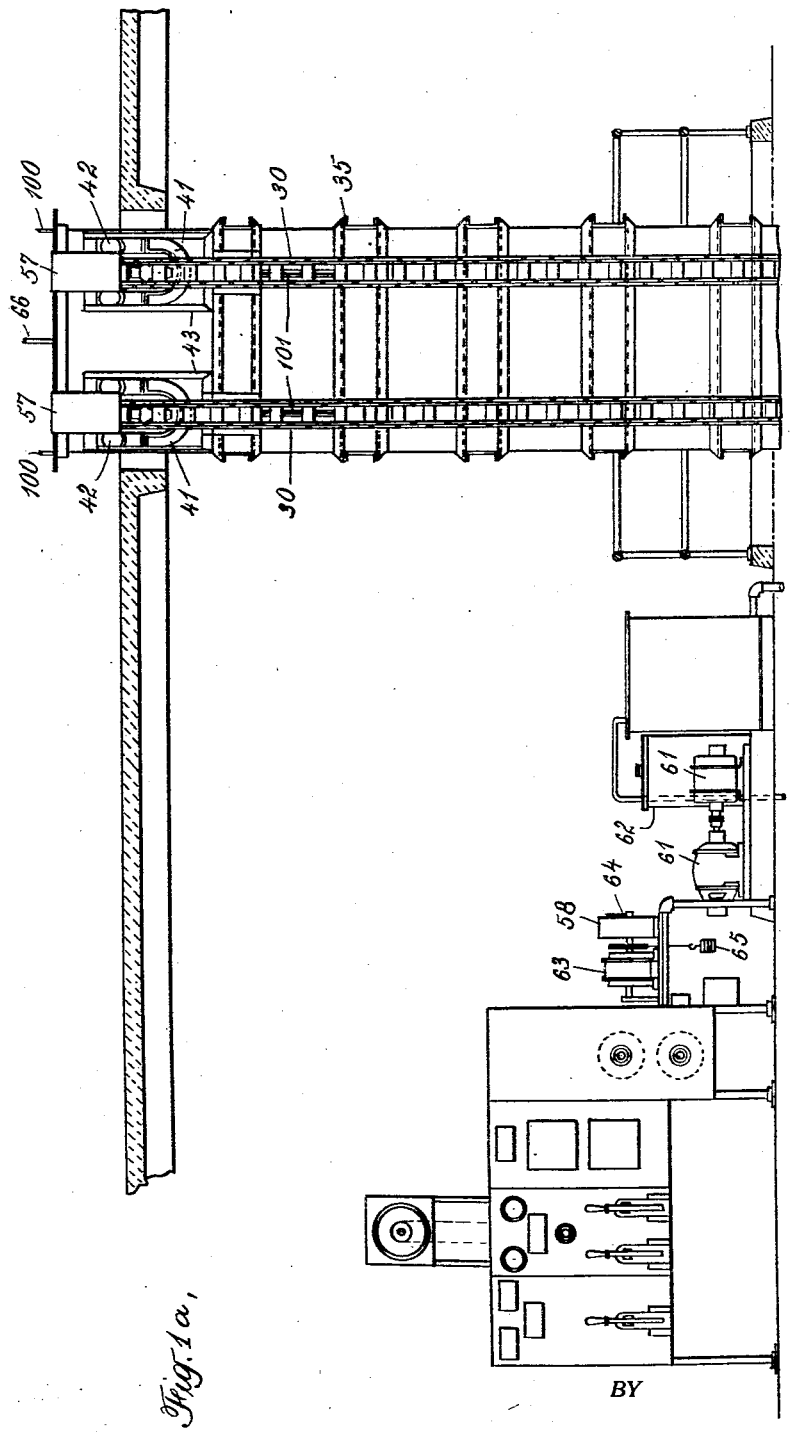

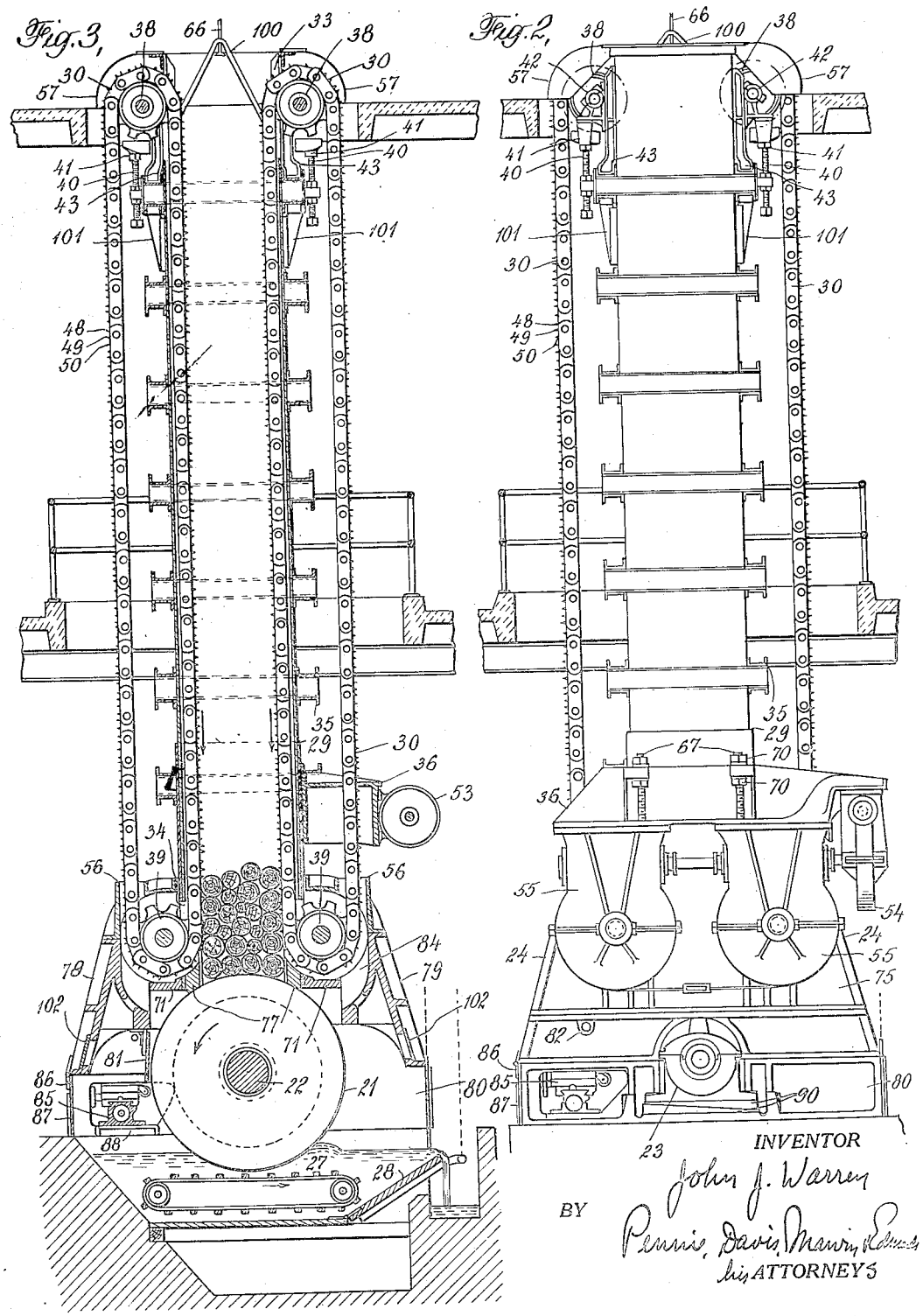

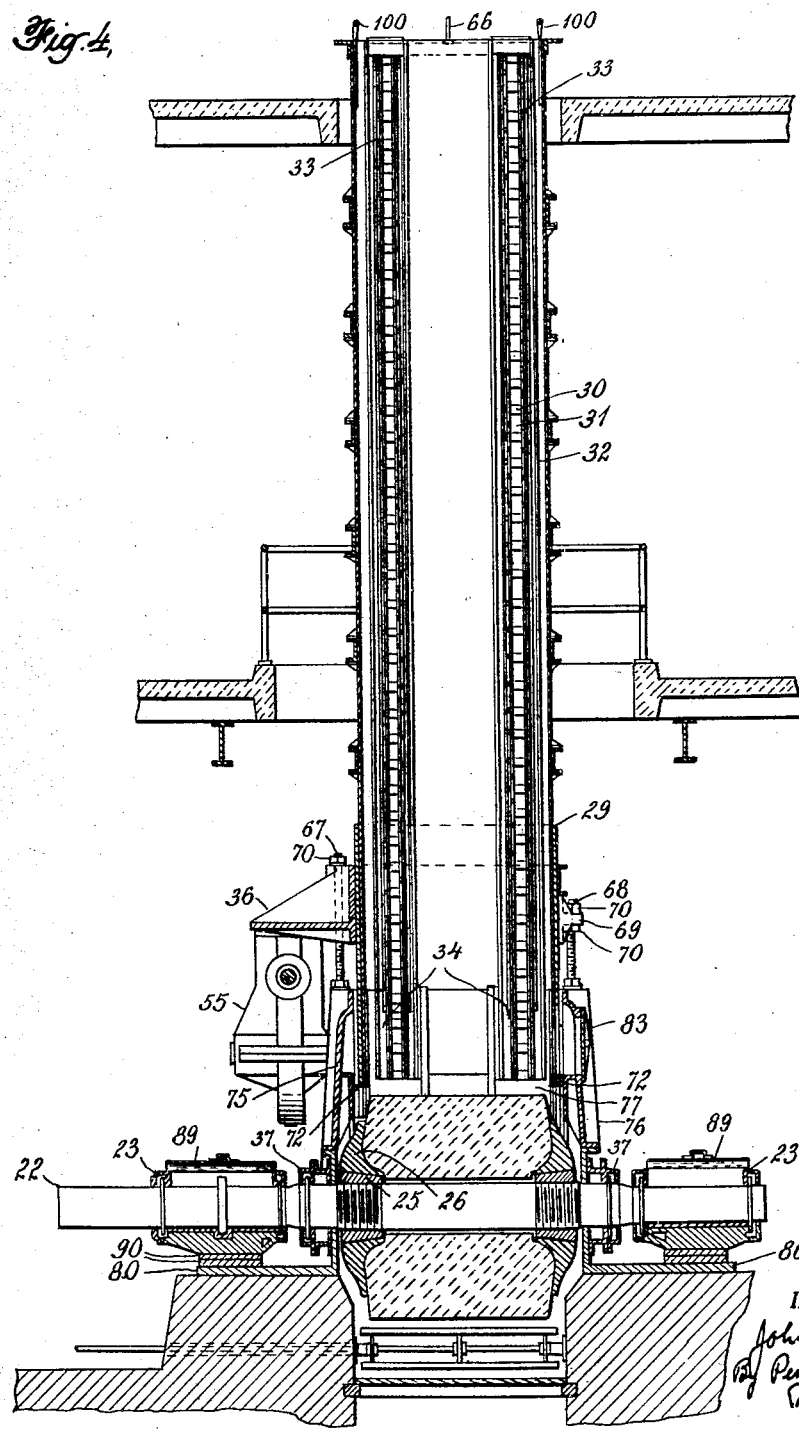

Aug. 19, 1924.
J. J. WARREN
1,505,757
APPARATUS FOR GRINDING WOOD PULP
Filed Oct. 14, 1922   7 Sheets-Sheet 5
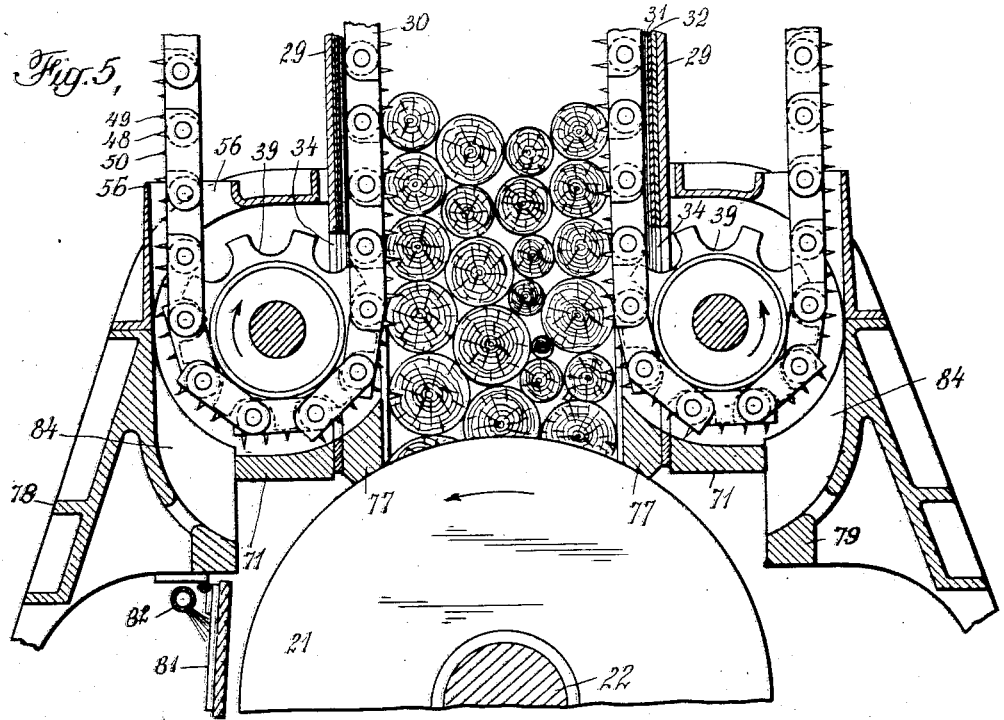
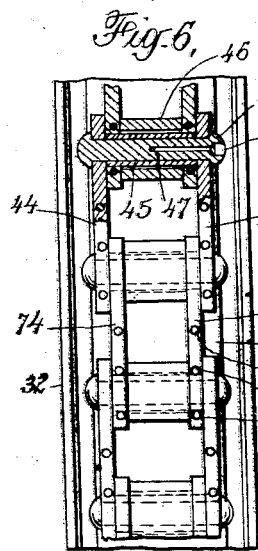
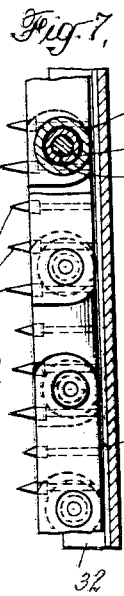
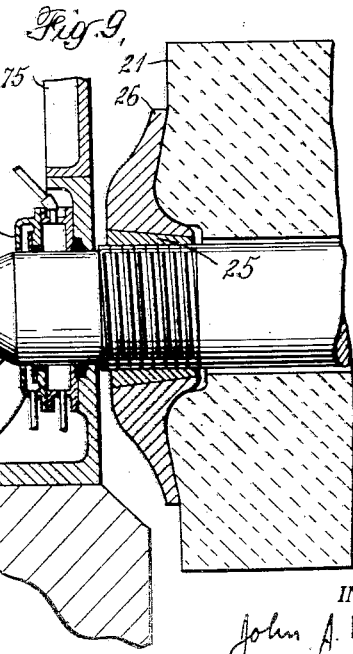
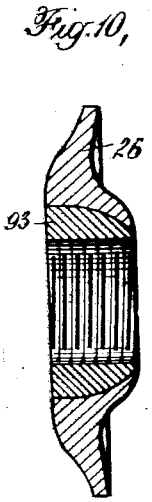
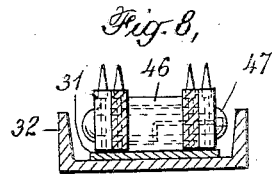
INVENTOR
John J. Warren
BY Pennie, Davis, Marvin & Edmonds
his ATTORNEYS

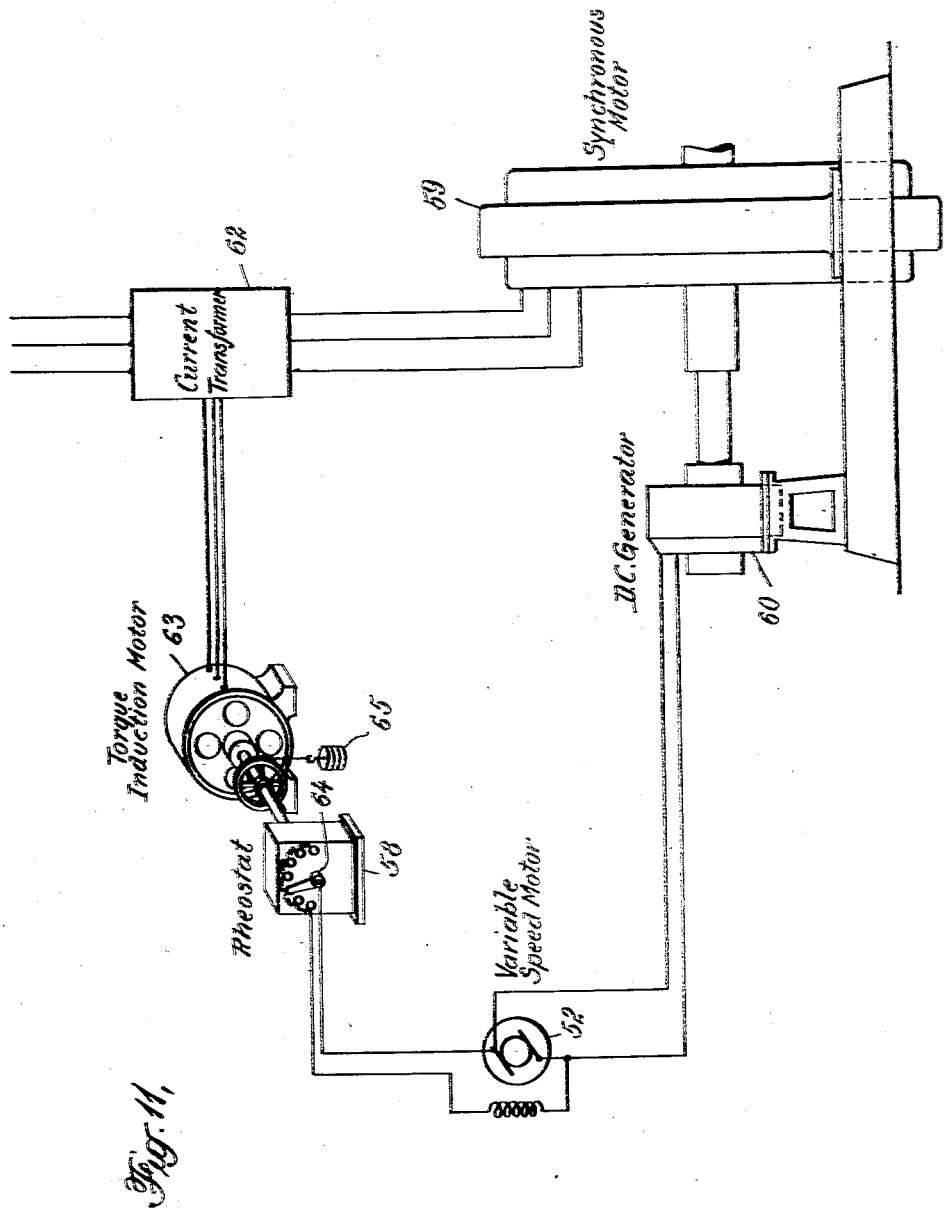

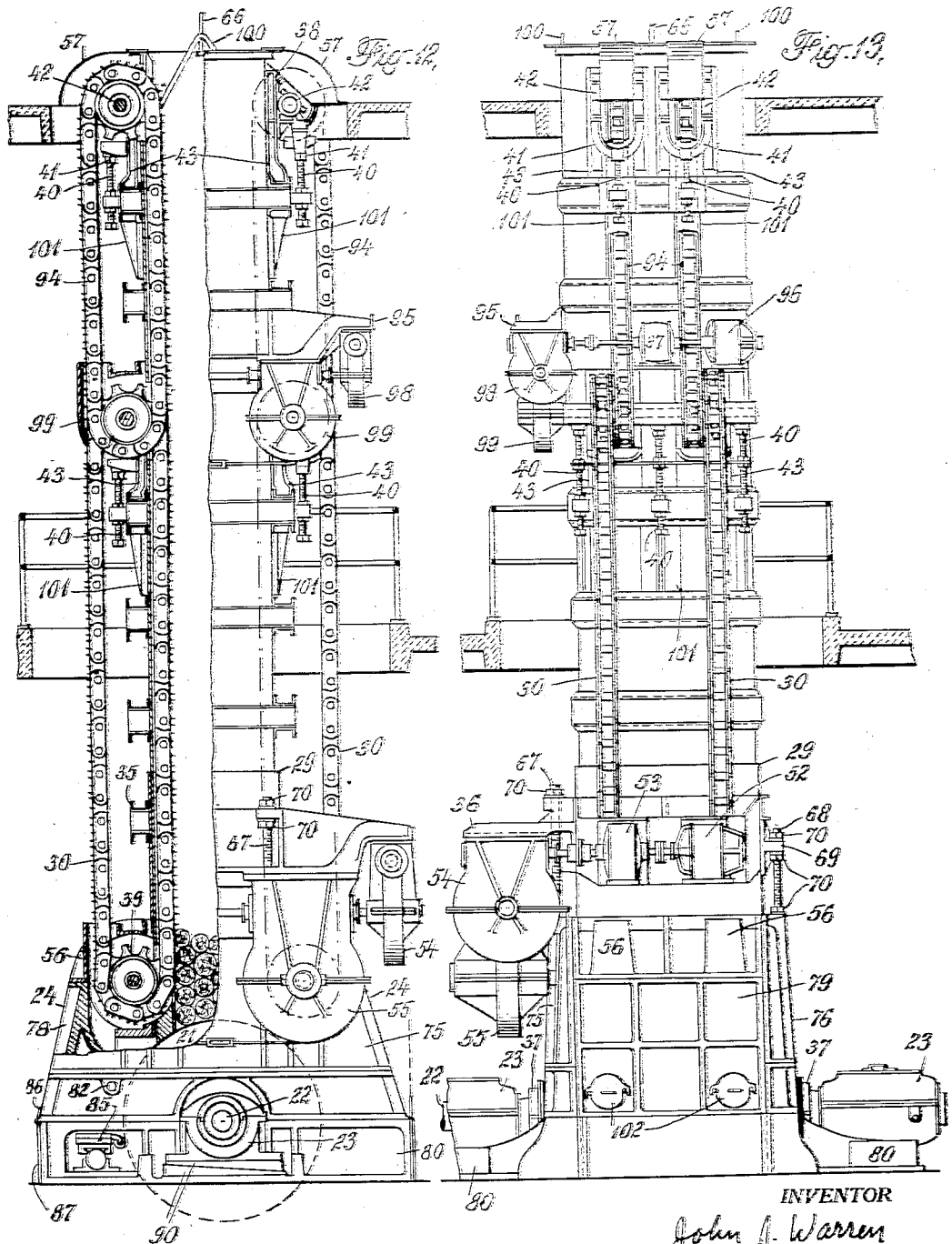

Patented Aug. 19, 1924.

1,505,757

UNITED STATES PATENT OFFICE.

JOHN J. WARREN, OF BROWNVILLE, NEW YORK.

APPARATUS FOR GRINDING WOOD PULP.

Application filed October 14, 1922. Serial No. 594,501.

*To all whom it may concern:*

Be it known that I, JOHN J. WARREN, a citizen of the United States, residing at Brownville, in the county of Jefferson, State of New York, have invented certain new and useful Improvements in Apparatus for Grinding Wood Pulp; and I do hereby declare the following to be a full, clear, and exact description of the invention, such as will enable other skilled in the art to which it appertains to make and use the same.

This invention relates to the grinding of wood into the so-called "mechanical" pulp used in the manufacture of newsprint and other cheap papers, and more particularly to improvements in grinders of the magazine type, and methods of grinding wood therein. The present application is a continuation in part of my copending application, Serial No. 401,874, filed August 7, 1920, now Patent No. 1,465,069, August 14, 1923.

The most common type of mechanical wood pulp grinder in use today is that in which a plurality of pockets are radially disposed about a grindstone. Wood is periodically charged into these pockets and ground by being forced under pressure against a rapidly rotating grindstone. Such grinders possess the advantages of a positive and regulated feed, but the disadvantages of a feed which is not continuous, which requires constant watching lest the pocket become empty and the stone race, in which the power consumption is not constant and in which the grinding is being continually interrupted. The time lost in frequent filling of the pockets and the cost of labor to operate such types of machines is not inconsiderable, and the production is not constant because the amount of pulp ground varies while the supply of grinding water does not. But more serious than this is the continual interruption of the grinding action. During steady grinding the ground pulp in the pit piles up along the emerging face of the stone and cleans it. As soon as the grinding is interrupted, as by the emptying of a pocket, this condition is disturbed, and a considerable increase in power is required to start the grinding with a new pocket and get it back to normal again. With a pocket grinder no sooner is this normal reached than another pocket empties and conditions are again interfered with—and so on.

The magazine type of grinder avoids these disadvantages in a measure. In this grinder the wood is charged into a tall magazine positioned vertically above and adjacent to the grindstone, the capacity of this magazine being many times that of the pockets of the radial pocket grinder. Hence the necessity for constantly refilling the pockets is eliminated, and the continual interruption and disturbance of the grinding action might also be eliminated could a continuous feed be attained. Attempts have been made to rely upon the weight of the wood itself in the magazine to exert the necessary grinding pressure for a continuous feed, but these attempts have not been successful because the weight of an average column of pulp-wood twenty-six feet high and about ten square feet in cross section is approximately 6500 pounds, whereas a pressure of approximately 64,000 pounds is required when a grindstone of appropriate size is consuming maximum horsepower. It is therefore clear that to obtain the requisite pressure by gravity alone would necessitate the building of a magazine of impracticable height. To avoid this various methods and means have been proposed for supplementing the insufficiency of gravity.

It has been proposed to employ a series of reciprocating catcher members moving alternately up and down along the sides of the magazine and contacting with the ends of the logs to pull the column of wood downward in contact with the grindstone, but the mechanism of this type does not possess strength sufficient to accomplish this end and overcome the arching tendency of the logs, nor can it compensate for the loose and irregular packing of the logs due to the variation in size and shape. Furthermore, the feed is not continuous and grinding must stop during the retractile movement of the catcher members to their starting position, which means that the grinding is interrupted and the power consumption far from constant.

Another proposed grinder comprises a pair of alternately acting horizontal pressure feet which force the wood from the magazine against the sides of the grindstone. It is not possible to attain a constant feed with a device of this type due largely to the inequalities of the size of the logs, and to the fact that the wood does not always fall from the magazine and completely and quickly fill the space between the grindstone and the retracting pressure foot. This means that the feed is not constant, that the grinding is continually interrupted, and the power consumption of the stone must vary over a wide range.

As a still further improvement in the gravity feed magazine grinder it has been proposed to employ endless chains moving down the inner side walls of the grinder with the wood column. These chains reduce the friction between the wood and the magazine walls, thus increasing the effective gravity pressure, and they also add somewhat to the total pressure. But these chains have not solved the problem because they have been designed, not as the primary pressure applying means, but merely as auxiliaries to gravity. Various other arrangements of feed chains have also been proposed but these have been either too short to grip the wood sufficiently, have been designed to contact with the ends of the logs and not with their sides, or have turned about sprockets mounted so far above the grindstone that the wood has counterarched above the stone and interfered with the continuous and smooth operation of the grinder.

It is, therefore, first of all, an object of this invention to provide a magazine grinder with a feed which is positive and continuous. This is attained by the provision of opposing, continuously operating woodgripping feeding means acting along substantially the entire length of those sides of the magazine which, if extended, would intersect the cutting face of the stone, and operating up to a point so closely adjacent the grindstone that no counterarching or jamming of the wood can occur. The magazine being of substantial height relative to the diameter of the stone, the wood-gripping feeding means act along a column of wood of sufficient height to give the necessary purchase. Preferably I employ continuous, motor-driven chains which pass downward along the inner face of the magazine for substantially its entire length, and are driven by sprockets situated so close to the grindstone that no binding or counterarching of the wood occurs between the sprockets and the stone. These chains grip the wood at its side by means of spurs which dig into the wood, and slowly press the wood as a continuous compact column against the rotating stone. The construction of these chains and the location of the spurs are important and form a part of the invention.

But even with a continuous feed the power consumption of the grinder would not necessarily be constant, as the hardness of the wood and the tightness of the packing will vary from point to point along the magazine. A constant power consumption is greatly to be desired, not only because overload may burn out the motor, and because power is paid for on the basis of the peak load, but also because a more uniform pulp results. It is therefore a further object of this invention to make the rate of feed variable, responsive to the power consumption of the stone, so that an increase in the power is immediately followed by a slowing down of the feed chains, and vice versa. In this way by maintaining the power consumption practically constant, the grinding action is not disturbed and the grinder can work at maximum efficiency from week to week. This object is attained by the provision of means which control current to the feed chain motor, so that it bears a predetermined relation to the power consumption of the grindstone driving unit.

As the stone wears away and becomes smaller the space between it and the foot of the magazine becomes correspondingly larger, if this condition were not remedied small pieces of wood would be carried through between the bottom of the magazine and the grindstone and not be ground. Moreover the distance between the point where the chains leave the wood and the stone would increase. It is a further object of this invention to avoid these difficulties. This is done by making the magazine itself vertically adjustable, so that it can be lowered as the grindstone wears away the feed chains and the sprockets moving with it, and thus maintain a constant distance between the bottom of the magazine and the grindstone and between the point where the chains leave the wood and the grindstone.

It is a further object of this invention to provide suitable means for supporting and stiffening the lower end of the magazine as well as to provide a suitable beam on the grinder end to counteract the great pressure exerted against this part by the force of the grinding action. Means for counteracting this excessive pressure have never been heretofore provided for in any wood pulp grinder.

It is also an object of the present invention to provide means for delivering the wood to the feed chains in the form of a compact mass when so desired, and in fact to make the best continuous feed magazine grinder possible. Many other improvements not specifically discussed above will be described in the following detailed description and claimed in the appended claims.

A preferred embodiment of my invention is illustrated in the accompanying drawings, a study of which will make clear the principles involved. In these drawings Fig. 1 and 1ª taken together constitute an elevation of the complete grinder showing the magazine, the feed chains, the driving units and the feed control mechanism; Fig. 2 is a view of the grinder looking at the driving or motor side; Fig. 3 is a vertical section of the grinder looking from the driving or motor end and showing the relation of the various parts of the magazine to those of the grinder frame, particularly the provision made for centering the magazine over the grindstone as well as for stopping the escape of steam into the atmosphere of the grinder room, together with an arrangement for circulating the stock in the pit below the grindstone; Fig. 4 is a vertical section taken through the center line of the grinder parallel to the main shaft, showing the steel finger plates on the magazine and a water cooling arrangement located on the shaft between the housing and the bearings, as well as a method of circulating the stock in the pit below the grindstone; Fig. 5 is a large scale section showing the chain leaving the wood at the bottom sprocket and the spurs in the chain being withdrawn from the wood in the direction of their length, together with the allowance provided for, due to the decrease in the diameter of the grindstone; Figs. 6, 7 and 8 are large scale views showing the relation of the various parts of the chain to one another, the special track and the manner in which the chain rolls down the inside of the chain guide on the track in the magazine; Fig. 9 is a large scale section of one of the water jackets around the grindstone shaft showing the relation of the grindstone, concave stone flange, sole plate and bearing relative to the water jacket; Fig. 10 is a large scale section of the concave stone flange showing a self-centering brass interior bushing so arranged that the flange will fit a grindstone having non-parallel sides; Fig. 11 is a wiring diagram showing the connections of the principal electrical parts shown in Figs. 1 ad 1ª; Fig. 12 is an elevation of a modified form of grinder looking on the motor side showing the combination of chains used for packing and feeding the wood in the magazine against the grindstone; and Fig. 13 is an elevation of the form shown in Fig. 12 viewed parallel to the grinder shaft.

The magazine grinder shown in Figs. 1 to 9 inclusive comprises an ordinary cylindrical grindstone 21, enclosed within housing 24, mounted on shaft 22, journaled in water cooled bearings 23, and driven by a synchronous motor 59. The stone is securely fixed upon the shaft by means of bushings 25, and concave steel stone flanges 26, designed to hold it central on the shaft, even though cracked. Below the grindstone is a pit 27, one end of which forms a dam 28, or overflow of variable height to keep the bottom of the stone immersed in stock to any required depth and over which the ground wood pulp passes. Adjustably mounted on the housing 24, and located centrally over the grindstone is a vertical magazine 29, into the upper end of which is placed the wood to be ground.

A positive and continuous, though variable feed of wood in this magazine is secured by means of four endless thimble roller chains 30, two located on each of the two opposite sides of the magazine parallel with the shaft 22, and which roll down the inside of the magazine on specially prepared tracks 31, in chain guides 32, securely fastened to the magazine. A vertical slot 33, is cut in the web of each of the four guides and in the shell corresponding to where these slots come in the guides near the upper end of the magazine, to allow the chains 30, to enter the magazine and haul the wood against the grindstone. Likewise slots 34, are cut in the webs of each of the four guides and in the shell corresponding to where these slots come in the guides near the lower end of the magazine, to allow the chains to pass out of the magazine. The remainder of the inside of the magazine is lined with heavy planking (not shown). To prevent bulging of the magazine on account of the excessive internal pressure set up (due to the pressure exerted by the chains on the wood), beams 35 are riveted to the exterior of the magazine at intervals.

These feed chains 30 are unusually strong as they must exert a working pressure of approximately 64,000 pounds between the wood in the magazine and the grindstone. Each chain is made up of one continuous length having many sections or pitches of exactly the same distance between centers of pins (see Figs. 6, 7 and 8). Each pitch length of the type of feed chain 30, shown in Figs. 6, 7 and 8, is made up of two side links 44 and 74; one thimble 45; one roller 46; one pin 47; six spurs, two each of 48, 49 and 50; and a special oiling feature 51, located in the head end of each pin 47, for lubrication of the chain. These chains are of special construction, side links 74 are broached for thimble 45, so there may be no turning of 74 on 45, side links 44 are broached for one head of pin 47, in this head of the pin is located the special oiling feature for lubricating the chain by means of a pressure gun. The holes for thimble 45 and pin 47 are not located centrally in links 44 or 74, so that the roller 46 will project beyond the back of the side links 44 or 74, transmit the pressure to the tracks 31, and roll down the inside of the chain guides 32, on tracks 31. On the face of the chain against which the wood presses the links project beyond the face of the rollers a distance great enough to insure against the pressure forcing the wood against the face of the roller 46. If the wood presses against the rollers the chains will slide rather than roll down the tracks 31, and encourage spots on the rollers thereby weakening the chain, and increasing the power consumption. In the forward end of each link just ahead of the thimble is located one long spur or spike 48, following this is a spike of intermediate length 49 and in the center of each link is a short spike 50, the functions of which are to impale or spike the blocks of wood and force them downward against the grinding element. The position of the spikes in the links is all important; if they are not located toward the forward ends of the links they will tear a piece out of the block of wood as the chains move around the lower sprockets and away from the magazine, thus increasing the power consumption and doing considerable damage to the chains as well as increasing the amount of slivers. With the correct arrangement of these spurs the chain moves away from the wood around the lower sprockets as shown in Fig. 5, and, the links being in effect pivoted at their upper ends, the spurs are withdrawn from the wood in the direction of their length as a nail is drawn from a board, with ease and without tearing or ripping the wood.

The magazine is slightly larger at the top than in its main body. The purpose of this tapering of the top of magazine is gradually but surely to force the spikes into the blocks of wood and to compact the blocks into a solid mass so the chains will effectively hold the wood to be ground. For this purpose it has been found desirable to make the top of the magazine about (1") wider than the main body of the magazine. This taper should gradually decrease until about one-third the way down the magazine when it maintains a normal or constant width, until the magazine again tapers outwardly below the lower sprocket.

The feed chains 30 are driven by sprockets 39 mounted upon the lower end of the magazine and very close to the grindstone. As shown, the chains as they pass around these sprockets and the grindstone itself are substantially tangent to the same horizontal plane. As a matter of actual measurement, I have found that the distance between the top of the stone and the point where the chains leave the wood should be about 9 inches although it may be somewhat more than this and still avoid binding and counter-arching. It may also, of course, be less than this.

The sprockets 39 are driven by a variable speed feed motor 52, through the speed reducing transformer 53, worm gear 54, and worm gears 55. This drive is mounted on a frame 36, which is rigidly secured to the magazine 29. When the chains leave the lower sprockets they pass out of the housings through openings 56, ascend the outside of the magazine and are engaged by idler sprockets 38, over which the chains are carried and passed through the openings 33, in the upper end of the magazine to engage the wood and force it downward against the grindstone. These idler sprockets are journaled in bearings 42, raised by yokes 41 and vertically slidable on guides 43. By turning screws 40 supported upon brackets 101 the yoke 41 and bearing 42 can be raised to increase the distance between the centers of sprockets 38 and 39 and take up any slack in the chains. Guards 57 protect the workman on the charging floor against injury through coming in contact with the chains.

The grindstone is driven by synchronous motor 59. On the same shaft is mounted a direct current generator 60 driven by the motor 59, which excites the field of the latter and supplies power to the variable speed motor 52 during the time the synchronous motor is operating. Before starting the synchronous motor, however, it is necessary to reverse the variable speed feed motor 52, to release the pressure between the grindstone and the wood which would otherwise act as a brake. To do this a motor generator set 61, is installed to provide power to the variable speed feed motor when reversing.

Automatic regulation of the speed of the feed chains with reference to the power consumption of the synchronous motor driving the grindstone is obtained in the following way: Current is delivered to the synchronous motor 59, from the three main feeder lines; a torque motor 63 is connected in parallel with the motor 59, through a current transformer 62, so that the current transmitted to it is proportional to the current transmitted to the synchronous motor 59. The shaft of the torque motor is connected to the movable contact arm 64 of a rheostat 58, which controls the resistance in the field of the feed chain motor 52 and thus controls the current in the field and the speed of the motor. At full load the torque in the induction motor is balanced by a weight 65. If the load on the synchronous motor 59 drops off, the torque of the induction motor is decreased; the weight 65 overcomes the torque and produces rotation of the induction motor 63. This rotation of the induction motor 63 moves the rheostat arm across the face of the rheostat 58, and inserts additional resistances in the field circuit of the variable speed feed motor, which causes this motor to speed up. This results in increasing the load on the synchronous motor producing a balanced system. Conversely if the load on the synchronous motor increases, the torque of the induction motor is increased; the torque overcomes the weight and produces rotation of the torque motor in the opposite direction, which moves the rheostat arm across the face of the rheostat and displaces resistance in the field circuit of the variable speed feed motor causing the speed of this motor to decrease. This results in decreasing the load on the synchronous motor, producing a balanced condition. If the wood were always fed at a constant rate against the grindstone, then, when grinding small, soft or loosely packed blocks of wood, the power consumption would drop below the minimum required for efficiency, whereas when grinding large, hard, or tightly packed blocks of wood, the power consumption would rise to a point where the motor would be burned out. With the variable speed automatically regulated as described in this invention the speed of the feed motor varies with the character, condition and compactness of the wood being ground in the magazine, thus maintaining the original idea of grinding wood at a practically constant power consumption of the grindstone by varying the feed of the wood against the grindstone.

In connection with this electrical arrangement for controlling the feed of the wood in the magazine I desire it to be fully understood that I am quite aware of certain electrical devices for controlling the feed of certain machines such as United States Patent 1,070,638, dated Aug. 19, 1913, granted to L. H. Thullen of Cincinnati, O., as well as to others for the purpose of automatically controlling electric motors driving feed carriages for friction or other saws. In my invention I make use of a different though somewhat similar arrangement of electrical control and apply my arrangement of electrical control to the operation of a magazine wood pulp grinder. The electrical control of itself, I do not claim, but I do claim the use of such control in conjunction with magazine grinders for grinding wood pulp It is common practice to supply the water necessary for grinding wood at the face of the grindstone with the attendant dangers previously disclosed. In this invention, water is introduced at the upper end of the magazine through pipe 66, and sprayed over the wood in the upper part of the magazine. This water trickles down over the blocks in the magazine, absorbs the hot water vapor rising from the grinding surface, becomes hot and a percentage reaches the grindstone in the form of hot water. The percentage of water entering the top of the magazine that does not reach the grindstone in the form of hot water is absorbed by the blocks of wood in the magazine which become softened before reaching the grinding element. This contact of water and hot water vapor has not only resulted in preheating the water reaching the grindstone as well as softening the wood in the magazine, but the vapor rising from the grindstone is eliminated. The efficiencies derived from introducing water at the top of the magazine are very important. The benefits may be reviewed as follows, first, the water is preheated before coming in contact with the grindstone, thus minimizing the danger of cracking or shelling; second, the wood is thoroughly softened before grinding and consumes a minimum of power; the sensible heat otherwise lost or requiring means for removing the same is conserved and used.

In order to compensate for the wear of the grindstone, the magazine is constructed to allow of vertical adjustment. Magazine 29 is supported on the housings 75 and 76, by means of adjusting screws 67 and 68, that pass through the brackets 69 and frame 36, which are securely riveted to the magazine. Each adjusting screw is provided with three nuts 70, which when properly set and tightened hold the magazine adjacent to the grindstone. To locate the magazine centrally above the grindstone no matter whether the size of this grindstone be maximum or minimum, also to prevent the passage of steam from the inside of the housing into the atmosphere of the grinder room, the magazine is provided with two angle seals 71, and two plate seals 72, which are a part of the magazine and are machined smooth and square, thus locating the magazine centrally on the grindstone as well as providing a perfect seal against the escape of the steam within the housing.

In order to take care of this great pressure existing within the lower end of the magazine, I provide cast steel finger plates 77 riveted on the inside of the magazine and heavy cast steel angle seals 71 riveted on the outside continuing the entire distance across the magazine. The whole may now be considered a built up beam of enormous strength. To oppose the pressure of this beam and to take the pressure exerted on this by the force of the grinding action there is incorporated in the grinder end 78 another very heavy beam which provides the bearing or track for this improved foot of the magazine to slide upon, and transmits the thrust to the grinder frame. This sliding referred to is necessary because the diameter of the grindstone constantly decreases due to wear and the magazine must be lowered. On account of the corrugated shape of the lower edge of these finger plates the ground wood can escape from the magazine into the pit 27 below. If for any reason these apertures become blocked there is a clearance provided at the bottom of the magazine on the two ends on which the chains do not operate where the ground wood can flow out of the magazine over the concave steel flanges holding the grindstone and into the pit below.

The heat due to grinding is conducted through shaft 22 to bearings 23, which often results in melting the soft bearing metal with which these bearings are lined. I have provided means for cooling the shaft between the housing and the bearings 23. This apparatus comprises a pair of water cooling jackets 37, through which water is forced under pressure. The water jackets are assembled in four pieces around the shaft and are bolted to the housings 75 and 76. Packing is provided at both ends of the water jackets to prevent the leakage of water between the shaft and the jacket. Water is introduced at the top of these jackets, flows around the shaft 22, and away through an opening in the bottom of the water jackets. In the above manner, the heat conducted from the grindstone along the shaft is absorbed by the cooling water and carried off, thus eliminating a serious source of trouble in the bearings.

Bearings 23 are of special design and are arranged so that a constant flow of water is circulated within the bearing to assist in keeping the bearing metal cool. To lubricate the shaft in this bearing, oil is supplied to the shaft from a special spray pipe 89. Should lateral adjustment of the bearing be necessary this may be accomplished by means of set screws. To provide for vertical adjustment wedges 90 may be moved toward or away from one another by means of set screws mentioned above.

To support the magazine and provide a covering for the grindstone, also to take the thrust from the magazine due to grinding, a substantial housing consisting of grinder sides 75 and 76, grinder ends 78 and 79, and sole plates 80 is provided. Within this housing and located in front of the grindstone is a swinging flashboard 81, provided with a toothed design on its lower edge. The function of this is to keep the cold spray water fed to the pulp in the pit from striking the grindstone directly, as well as to give an equal distribution of the water sprayed on the upper part of the flashboard by the spray from the spray pipe 82, and descending into the pit 27. A door 83 is provided in grinder side 76, farthest from the synchronous motor, to permit removing the wood in the magazine when required. In grinder ends 78 and 79 are special slots 84 to provide space for the sprockets 39 and chain 30, when the magazine reaches its lowest position. To inspect quickly the operation of the grindstone or that part of the grinder within the housing, peep-holes 102 are located in the grinder ends 78 and 79. Should it become necessary to change the grindstone or make repairs in the pit, the entire magazine and housing are lifted bodily by means of rings 100.

To true up the grindstone and keep the same in a condition for efficient grinding, a hydraulic stone truing lathe 85 is provided and supported on the inside of the sole plates 80. To allow for ease of operation and so the workman will not have to get his arm inside the grinder housing when sharpening the stone, this stone truing lathe is made to project through openings in each of the sole plates 80, thus allowing the carriage on the stone truing lathe to be run out of the housing at any time. When necessary to follow the carriage across the face of the grindstone a narrow door 86 is provided, the bottom of the opening between the sole plates is covered by two sliding doors 87. To permit of sharpening the grindstone when it has been reduced in diameter and it is no longer possible to run the carriage holding the burr against the grindstone, a bracket 88 on the inside of each sole plate allows for the stone truing lathe being advanced as required.

Located in the pit with the stock is an agitator 91 to prevent the accumulation of slivers or heavy stock. Slivers will burn the face of the grindstone and destroy its cutting surface if allowed to rub against it for a period of time. The accumulation of heavy stock in any one place in the pit will cause the water in the stock to leave the same and run away in channels in the pulp, thus permitting the grindstone to become very hot with the possibility of fracturing.

The method of operating the apparatus previously described may be reviewed as follows. Magazine 29 is filled with pulp wood lying parallel to the face of the grindstone, water is sprayed on this wood through a supply pipe 66, situated at the upper end of the magazine and continuous feed chains of heavy design containing spurs as shown in Figs. 6, 7 and 8 and operating at very slow speed impale or spike the blocks of wood near the top of the magazine and carry them downwards against the rotating grindstone. The force exerted on a column of wood by the spurs in the entire length of the magazine is sufficient to prevent the wood arching and sets up a pressure within the magazine sufficient to force the wood against the grindstone and grind the blocks of wood into pulp. It has been found after repeated observations that when the sprockets are located a considerable distance up the magazine binding caused by counter-arching within the lower end of the magazine is set up, the wood is not fed down the magazine at a constant rate, excessive strains are put on the various members and the power consumption is not constant over a period of time. When the sprockets are placed in their extreme low position counter-arching ceases, the wood moves down the magazine in the form of a continuous column, the pressure lines pointing downward and toward the centre so as to form a cone having its apex pointing downward. When such a condition is obtained, the apex of every cone formed is being continuously ground off; then, and then only, can wood be ground in the form of a continuous column. The lower end of the magazine from about the center line of the bottom sprocket to that edge which is adjacent to the face of the grindstone, is tapered to a slightly larger size than the section at, and above the sprockets 39, this so as to reduce binding and arching in the section below where the spurs are withdrawn from the wood. It so happens when dry wood is being ground, that the swelling in this section due to steaming of the wood will be considerable and cause binding which is overcome by slightly tapering the lower part of the magazine. The pulp after being ground in the magazine is carried through openings in the finger plate 77 by the revolving grindstone and is deposited in the pit 27, where it is circulated by agitator 91, flows over the inclined dam 28 and is carried away to the screens. The lower part of the stone is always rotating in a pulp bath. As the upwardly moving face of the stone emerges from this bath the pulp rolls from it in such a manner as to clean it and permit its return to the wood in excellent condition. When this action is disturbed the stone is slimed over and an excess of power is consumed before the stone settles down to normal grinding again.

Fitting the concave flanges to the grindstone is difficult if the sides of the stone be not parallel. I overcome this difficulty by providing a self-centering bushing 93, having a curved exterior which allows of a slight movement of the concave steel stone flange 26 on the spherical surface of the brass bushing 93. (See Fig. 10).

In order to deliver the wood to the feed chains in the form of a compact mass a set of packing chains may be employed as shown in the modified form of grinder shown in Figs. 12 and 13. These packing chains 94 are operated in a similar manner to that in which the single set of feed chains are operated. Frame 95 is rigidly attached to the magazine and supports the driving arrangement as well as the reduction gearing for this drive. The packing chains are driven by a variable speed motor 96. Current is supplied to this motor by means of a motor generator set (not shown). This current passes through a current regulator, as, for example, a Brush regulator, placed in the line between the motor generator and the motor 96, thus only a definite power or torque can be delivered at a given voltage. For example, if the wood being fed by the chains 30 decreases in velocity down the magazine then the pressure between the wood held by the packing chains 94 and the wood held by the feed chains 30 must become a maximum. To work against the wood held by the feed chains 30 we have only a given pressure controlled by the current regulator mentioned above. Now if the resistance against the motor increases so it cannot operate at full speed the motor slows down and if the resistance were ever great enough the motor would actually stall or cease to rotate. This latter condition would not in any way injure the motor or cause burning, because the current regulator controls the amount of current going to the motor 96 and there can never be more than a predetermined amount of torque on this motor. As already described a given amount of power is always delivered to the motor 96 which can only overcome a certain pressure. When the resistance to the motor decreases the motor will start up if the motor is stalled, or if the motor has only slowed down the revolutions will increase to give the required pressure between the two bodies of wood in the magazine. The speed reducing arrangement for operating the packing chains 94 is obtained by means of spur gear reducer 97, worm gear reducer 98, and worm gears 99. The feed chains in this instance are operated in exactly the same manner and with exactly the same reducing gearing as that previously described for operating the feed chains in Figs. 1 to 6. The arrangement described above is shown in Figs. 12 and 13 of the accompanying drawings.

The complete apparatus as described permits of grinding wood continuously without an interruption even when the grindstone is being sharpened, and with a substantially constant power consumption of the grindstone.

Cross-reference is hereby made to the following copending applications: Serial No. 696,781, filed March 4, 1924; Serial No. 696,782, filed March 4, 1924; and Serial No. 703,343, filed April 1, 1924.

I claim:

1. A wood-pulp grinder of the magazine type comprising the combination of a grindstone, a magazine of substantial height in comparison with the diameter of the grindstone, mounted above the grindstone, endless feed chains designed to move in a plane parallel to the plane of rotation of the grindstone along substantially the entire length of the magazine, means carried by the chains to positively grip the wood along its sides and continuously force it against the grindstone, and driving sprockets for the chains situated so closely adjacent the grindstone that the wood cannot arch or jam in the lower end of the magazine.

2. A wood-pulp grinder of the magazine type comprising the combination of a grindstone, a magazine adjacent the grindstone and adapted to receive the wood to be ground, endless feed chains operating in the magazine for positively feeding the wood to the grindstone, a variable speed motor driving the feed chains, and means for varying the speed of the motor relative to the power consumption of the grindstone.

3. A wood-pulp grinder of the magazine type comprising the combination of a grindstone, a magazine adjacent the grindstone adapted to receive the wood to be ground, feeding means for gripping the wood and continuously forcing it against the grindstone, designed to travel with the wood along those sides of the magazine which, if extended, would intersect the cutting face of the grindstone, the point where the wood leaves the feeding means being so closely adjacent the grindstone that the wood cannot arch or jam in the lower end of the magazine.

4. A wood-pulp grinder of the magazine type, comprising the combination of a grindstone, a magazine adjacent to the grindstone and adapted to receive the wood to be ground, endless feed chains operating in the magazine for positively feeding the wood to the grindstone, a variable speed motor driving the feed chains, a rheostat controlling the current through the field of the variable speed motor, and means responsive to the power consumption of the grindstone operating the rheostat and thus controlling the speed of the feed motor.

5. A wood-pulp grinder of the magazine type, comprising the combination of a grindstone, a synchronous motor driving the grindstone, a current transformer in the line feeding the synchronous motor, a magazine adjacent to the grindstone and adapted to receive the wood to be ground, endless feed chains operating in the magazine for positively feeding the wood to the grindstone, a variable speed motor driving the feed chains, a rheostat controlling the current through the field of the variable speed motor, a torque motor in parallel with the synchronous motor through the current transformer operating the rheostat to throw in more resistance as the power consumed by the synchronous motor decreases, and vice versa, thus causing the speed of the feed motor to vary inversely with the power consumption of the synchronous motor.

6. In a wood-pulp grinder of the magazine type the combination of linked feeder chains operating within the magazine and wood-gripping spurs near the forward ends of the links thereof.

7. In a wood-pulp grinder of the magazine type the combination of a grindstone, a magazine for holding the wood to be ground, a linked feeder chain operating within the magazine to feed the wood downwardly, a sprocket near the base of the magazine about which the chain turns, wood-gripping spurs near the forward ends of the chain links so designed that when the chain turns about the lower sprockets the spurs are withdrawn from the wood substantially in the direction of their length.

8. A wood-pulp grinder of the magazine type comprising the combination of a grindstone, a magazine adjacent to the grindstone and adapted to receive the wood to be ground, and endless feed chains equipped with wood-gripping spurs operating in the magazine for positively feeding the wood to the grindstone, and driving sprockets for the chains situated at the lower end of the magazine, the driving sprockets and the grindstone being substantially tangent to the same horizontal plane, and the axes of rotation of the driving sprocket and the grindstone being parallel.

9. A wood-pulp grinder of the magazine type comprising the combination of a grindstone, a magazine adjacent to the grindstone and adapted to receive the wood to be ground, and endless feed chains operating in the magazine for positively feeding the wood to the grindstone, trackways for the chains on the inner face of the magazine, and anti-friction rollers on the chains contacting with the trackways.

10. In a wood-pulp grinder of the magazine type, the combination of linked feeder chains operating within the magazine, anti-friction rollers on the chains preventing contact of the links with the magazine walls, and means for lubricating the chains.

11. In a wood-pulp grinder of the magazine type, the combination of linked feeder chains operating within the magazine, anti-friction rollers on the chains preventing contact of the links with the magazine walls, and means protecting the rollers from the wood in the magazine so that they shall be free to rotate.

12. In a wood-pulp grinder of the magazine type, the combination of linked feeder chains operating within the magazine and a series of wood-gripping spurs of graduated lengths on the links, the longest spurs being nearest the forward ends of the links.

13. In a wood-pulp grinder of the magazine type, the combination of linked feeder chains operating inside the magazine, all the links being equipped with wood-gripping spurs near the forward ends, and continuing to the center of each link, all ahead of the rear pin on which the link fulcrums.

14. A wood-pulp grinder of the magazine type, comprising the combination of a grindstone, a magazine adjacent the grindstone for receiving the wood to be ground, endless feed chains operating in the magazine for positively feeding the wood to be ground to the grindstone, and separate packing chains in the upper end of the magazine for feeding the wood to the feed chains in compact form.

15. A wood-pulp grinder of the magazine type, comprising the combination of a grindstone, a magazine adjacent the grindstone for receiving the wood to be ground, endless feed chains operating in the magazine for positively feeding the wood to be ground to the grindstone, separate packing chains in the upper end of the magazine for feeding the wood to the feed chains in compact form and a variable speed motor driving said packing chains, the speed of said motor varying inversely with the pressure exerted by the packing chains.

16. A wood-pulp grinder of the magazine type, comprising the combination of a grindstone, a magazine adjacent the grindstone for receiving the wood to be ground, endless feed chains operating in the magazine for positively feeding the wood to be ground to the grindstone, separate packing chains in the upper end of the magazine for feeding the wood to the feed chains in compact form and a variable speed motor driving said packing chains, designed to cease operating when the pressure exceeds a predetermined maximum.

17. In a wood-pulp grinder of the magazine type the combination of a grindstone, a magazine for holding the wood to be ground, a linked feeder chain operating within the magazine to feed the wood downwardly, a sprocket near the base of the magazine about which the chain turns, wood-gripping spurs near the forward ends of the chain links so designed that when the chain turns about the lower sprockets the spurs are withdrawn from the wood substantially in the direction of their length, pockets in the grinder ends for the purpose of containing the sprockets as the stone wears away and the magazine is lowered.

18. A wood-pulp grinder of the magazine type, comprising the combination of a grindstone, a housing therefor, a magazine mounted upon the housing for receiving the wood to be ground, means for adjusting the position of the magazine relative to the grindstone so that as the stone wears the spacing of the lower end of the magazine relative to the grinding surface can be held constant, vertical trackways on the inner face of the housing and means for supporting the lower end of the magazine against the trackways in all positions of the magazine.

19. A wood-pulp grinder of the magazine type, comprising the combination of a grindstone, a magazine situated centrally and adjacent to said grindstone and adapted to receive the wood to be ground, and endless chains operating the entire length of the magazine to force the wood against the grindstone, the said magazine being slightly larger at the top when in the main body of the magazine where it maintains a normal or constant width until the magazine tapers outwardly near the lower sprocket.

20. A wood-pulp grinder of the mazazine type, comprising the combination of a grindstone, a magazine adjacent the grindstone and adapted to receive the wood to be ground, endless feed chains operating in the magazine and mounted thereon for positively feeding the wood to the grindstone, a motor mounted upon the magazine for driving the feed chains, and means for adjusting the position of the magazine relative to the grindstone so that as the stone wears the relation of the magazine and the feed chains to the grinding surface can be held constant.

21. A wood-pulp grinder of the magazine type, comprising the combination of a grindstone, a magazine adjacent thereto receiving the wood to be ground, endless feed chains operating in the magazine for positively feeding the wood to the grindstone, upper and lower sprocket wheels mounted upon the magazine about which the feed chains travel, driving means mounted upon the magazine for driving the lower sprockets, and means whereby the entire magazine with its feed chains, sprockets and driving mechanism can be moved bodily toward and away from the grindstone so that as the stone wears the relative position of the parts shall remain unchanged.

22. A wood-pulp grinder comprising the combination of a grindstone, a magazine adjacent the grindstone adapted to receive the wood to be ground, means continuously operating along those sides of the magazine which, if extended, would intersect the face of the grindstone for gripping the wood and forcibly feeding it against the grindstone, and means for increasing the lateral pressure on the wood in the interior of the charge to compact it as it approaches the grindstone.

23. A wood-pulp grinder comprising the combination of a grindstone, a magazine adjacent the grindstone adapted to receive the wood to be ground, the width of the magazine decreasing toward the grindstone, and oppositely disposed feed chains within the magazine for forcing the wood against the grindstone.

24. A wood-pulp grinder of the magazine type, comprising the combination of a grindstone, a housing therefor, a magazine mounted upon the housing for receiving the wood to be ground, means for forcing the wood in the magazine against the grindstone, means for adjusting the position of the magazine relative to the grindstone so that as the stone wears the spacing of the lower end of the magazine relative to the grinding surface can be held constant, and reenforcing means on the housing and the lower end of the magazine cooperating to sustain the grinding pressure in all positions of the magazine.

25. A wood-pulp grinder of the magazine type, comprising the combination of a grindstone, a housing therefor, a magazine mounted upon the housing for receiving the wood to be ground, means for forcing the wood in the magazine against the grindstone, and a reenforcing beam extending across the lower end of the magazine cooperating with the housing to sustain the grinding pressure in all positions of the magazine.

26. A wood-pulp grinder of the magazine type comprising the combination of a grindstone, a magazine of substantial height in comparison with the diameter of the grindstone, mounted above the grindstone, endless wood-gripping feed chains operating along substantially the entire length of the magazine to grip the wood along its sides and continuously force it against the grindstone, and driving sprockets for the chains situated near the lower end of the magazine, the width of the magazine being slightly greater adjacent the grindstone than at the point where the driving sprockets are mounted.

27. A wood-pulp grinder of the magazine type, comprising the combination of a grindstone, a synchronous motor driving the grindstone, a magazine adjacent to the grindstone and adapted to receive the wood to be ground, endless feed chains operating in the magazine for positively feeding the wood to the grindstone, a variable speed motor driving the feed chains, a rheostat controlling the current through the field of the variable speed motor, a torque motor in parallel with the synchronous motor operating the rheostat to throw in more resistance as the power consumed by the synchronous motor decreases, and vice versa, thus causing the speed of the feed motor to vary inversely with the power consumption of the synchronous motor.

28. A wood-pulp grinder of the magazine type, comprising the combination of a grindstone, a magazine adjacent thereto receiving the wood to be ground, feed chains mounted upon and carried by the magazine for positively forcing the wood against the grindstone, driving sprockets for the feed chains mounted upon the magazine adjacent the grindstone, and means for adjusting the position of the magazine relative to the grindstone so that as the stone wears the relation of the driving sprockets to the grinding surface can be held constant.

29. A wood-pulp grinder of the magazine type, comprising the combination of a grindstone, a magazine situated adjacent to said grindstone and adapted to receive the wood to be ground, wood-feeding means supported upon the magazine and operating along those sides of the magazine which if extended would intersect the cutting face of the grindstone engaging the sides of the charge for forcibly feeding it to the grindstone, and operating for substantially the entire length of the magazine, the point where the wood leaves the feeding means being so closely adjacent the grindstone that the wood cannot arch or jam in the lower end of the magazine, and means for adjusting the position of the magazine relative to the grindstone so that as the grindstone wears away the relation between the feeding means and the grinding surface can be held constant.

30. A wood-pulp grinder of the magazine type comprising the combination of a grindstone, a magazine adjacent the grindstone adapted to receive the wood to be ground, feeding means operating along the sides of the magazine for continuously forcing the wood against the grindstone, the point where the wood leaves the feeding means being so closely adjacent the grindstone that the wood cannot arch or jam in the lower end of the magazine, and reenforcing means on those sides of the magazine along which the feeding means operate and between the point where the feeding means leave the wood and the stone, to withstand the outward thrust of the wood.

31. A wood-pulp grinder of the magazine type comprising the combination of a grindstone, a magazine adjacent to the grindstone and adapted to receive the wood to be ground, endless feed chains operating in the magazine for positively feeding the wood to the grindstone, driving sprockets for the chains situated at the lower end of the magazine, the driving sprockets and the grindstone being substantially tangent to the same horizontal plane, and re-enforcing means between the driving sprockets and the grindstone for withstanding the outward thrust of the wood.

32. A wood-pulp grinder of the magazine type comprising the combination of a grindstone, a magazine adjacent the grindstone adapted to receive the wood to be ground, feed chains equipped with wood gripping and penetrating means for continuously forcing the wood against the grindstone designed to travel with the wood along those sides of the magazine which, if extended, would intersect the cutting face of the grindstone, and driving sprockets for the chains situated so closely adjacent the grindstone that the wood cannot arch or jam in the lower end of the magazine.

33. A wood-pulp grinder comprising the combination of a grindstone, a magazine adjacent the grindstone adapted to receive the wood to be ground, the width of the magazine decreasing toward the grindstone, and oppositely disposed wood feeding means designed to operate continuously along those sides of the magazine which, if extended, would intersect the face of the grindstone for gripping the wood and forcibly feeding it against the grindstone.

34. A wood-pulp grinder of the magazine type comprising the combination of a grindstone, a magazine adjacent the grindstone and adapted to receive the wood to be ground, wood feeding means operating along the sides of the magazine for positively and continuously feeding the wood to the grindstone, a variable speed motor driving the feeding means, and means for varying the speed of the motor relative to the power consumption of the grindstone.

In testimony whereof I affix my signature.

J. J. WARREN.